Oct. 29, 1935.  C. F. WAITE  2,018,693

DISPENSING APPARATUS

Filed June 16, 1934　　5 Sheets-Sheet 1

Witness
Paul F. Bryant

Inventor
Charles F. Waite

Oct. 29, 1935.　　　　　C. F. WAITE　　　　　2,018,693
DISPENSING APPARATUS
Filed June 16, 1934　　　　5 Sheets-Sheet 2

INVENTOR.
C. F. Waite
BY
A. H. Golden
ATTORNEYS.

Oct. 29, 1935.  C. F. WAITE  2,018,693

DISPENSING APPARATUS

Filed June 16, 1934   5 Sheets-Sheet 4

INVENTOR.
C. F. Waite
BY
A. H. Golden
ATTORNEYS.

Patented Oct. 29, 1935

2,018,693

UNITED STATES PATENT OFFICE 2,018,693

DISPENSING APPARATUS

Charles F. Waite, Stamford, Conn., assignor of one-half to Archibald W. Johnston, Stamford, Conn.

Application June 16, 1934, Serial No. 731,007

38 Claims. (Cl. 221—95)

This application is a renewal and a continuation in part of my application, Serial No. 594,252, filed February 20, 1932, for a Dispensing apparatus, and allowed on December 16, 1933.

The common form of liquid dispensing apparatus as typified by the usual gasoline dispensing pump is controlled by a manually operated valve at the nozzle. The pump in this type of apparatus is arranged to deliver a substantially constant volume, and the delivery through the nozzle is controlled by causing a by-passing of the gasoline which does not flow through the nozzle because of the degree of closure of the nozzle valve. Since the by-pass is ordinarily set to operate at a pressure higher than normal delivery pressure, the pump has a high starting torque; moreover, it takes more power when the nozzle is closed than when wide open, thereby requiring a larger power unit than is necessary to take care of normal demands. Furthermore, because of chatter, it is difficult to dispense the liquid slowly.

The principal objects of the present invention are to provide a pump capable of close adjustment of delivery with smooth and efficient operation, and also to provide a dispensing apparatus by which the delivery of fluid may be accurately controlled, with a particular view of operating with a power unit of small size.

My invention relates also to the varying of the pumping effort in accordance with the nozzle opening so as to avoid the use of the usual by-pass arrangement required in the dispensing art, and includes means for dispensing through a single hose nozzle or a plurality of hose nozzles utilizing but a single pump, and without using a by-pass for taking care of the surplus pumped fluid which is not allowed to issue from the dispensing nozzle or nozzles. In the original embodiment of my invention, disclosed in my application, serial No. 594,252 of which this is a renewal and a continuation in part, there are means for varying the pumping volume in accordance with the dispensing requirements of a dispensing nozzle. The newest embodiment is similar in many ways to that of my original disclosure and utilizes the principal elements of that disclosure, but I do however vary from my original disclosure by providing a more efficient volume control means.

In the improved form of my invention, I utilize a pump having a movable pumping element, the variable position of which determines the amount of pumped fluid. I arrange to connect this pump with either one or with a series of dispensing hose each equipped with a dispensing nozzle for controlling the flow therethrough. In an arrangement of this sort, were I to follow the teachings of the prior art, the pump would normally have a pumping volume rating equal to the dispensing capacity of the entire group of nozzles, where a plurality are used with but one pump, and there would be a by-pass arrangement so that when any one or all of the nozzles were closed, there would be a by-passing of the fluid which would normally otherwise be dispensed through the nozzles. This naturally would cause turbulating of the gasoline, which would lead to extreme vaporization, and great fire hazard. Furthermore, there would be considerable consumption of power, considerable vibration and noise. The invention originally disclosed in my application, provided means at the nozzle for controlling the positioning of the pumping element of the pump for varying the pumping volume in accordance with the opening of the nozzle. I propose to obtain the same results as in my first embodiment without utilizing any physical or other means connecting the pumping nozzle and the pump, relying instead on the pressure which is established when any one or all of the pumping nozzles are closed, for controlling the pumping volume. Incidentally, this invention makes it possible to adapt the control desired to the arrangement of a single pump equipped with a plurality of nozzles.

More particularly, in the preferred modification of my invention, I provide a pump with a variably positioned pumping element, the position of which is determined by a pressure controlled element whose position is in turn controlled by the opening and closing of any one or all of the series of nozzles connected to the pump. I shall now refer to the drawings.

Figures 1, 2, 3, 4, 5, 6, 7:
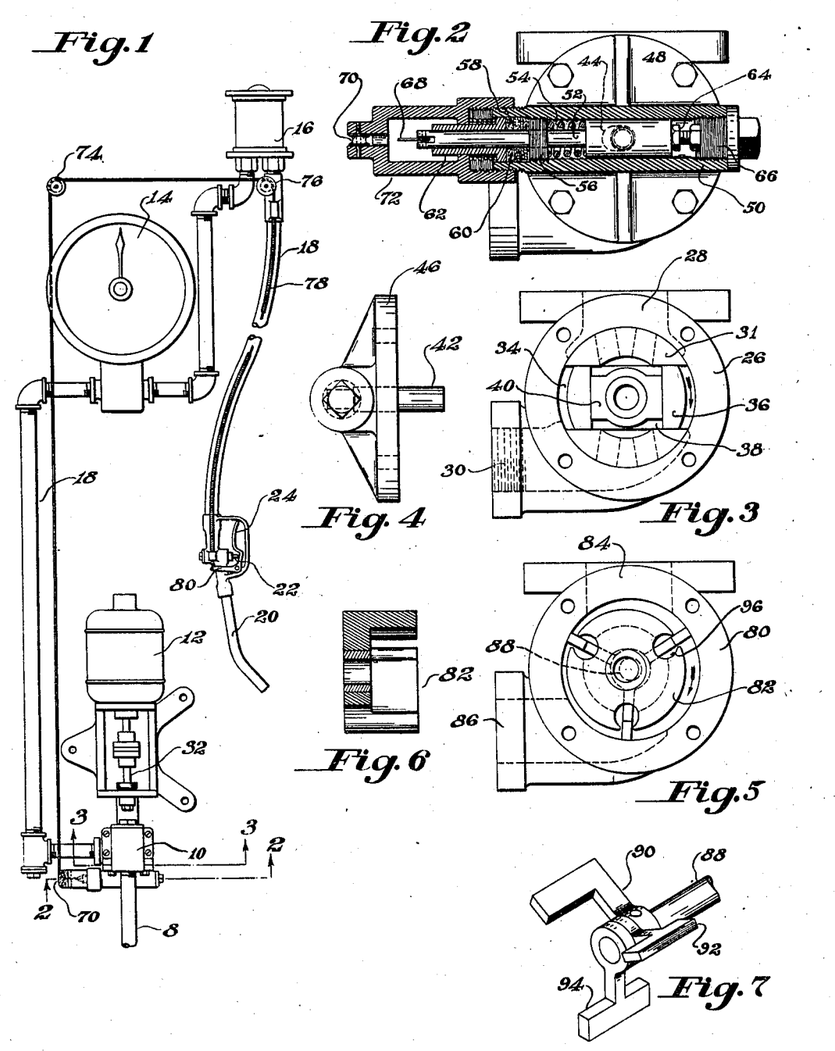
Fig. 1 is a diagrammatic elevation of a dispensing apparatus embodying the present invention.
Fig. 2 is a sectional elevation of the pump on an enlarged scale, being taken on line 2—2 of Fig. 1.
Fig. 3 is a section of the pump on line 3—3 of Fig. 1.
Fig. 4 is a side elevation of the head of the pump.
Fig. 5 is an elevation similar to Fig. 3, but showing a modified form of pump.
Fig. 6 is a sectional elevation of the rotor for the pump of Fig. 5.
Fig. 7 is a perspective view of the shaft and vane assembly for the pump of Fig. 5.

One modification of the invention is illustrated and described as embodied in a gasoline dispensing apparatus which is shown diagrammatically in Fig. 1. The apparatus comprises a pipe 8 leading from the tank, a pump 10, a motor 12 for driving the pump, a registering dial 14, a meter 16, pipe connections 18 leading from the pump to the meter, and a hose 19 leading from the meter to a nozzle 20. The nozzle includes a valve controlled by a protruding valve stem 22 which is operated by a trigger 24.

The form of pump, as shown in Fig. 3, is similar to that described in my co-pending application, Serial No. 594,252, filed February 20, 1932, and comprises a casing 26 having inlet and outlet chambers 28 and 30 respectively, the former connecting with the pipe 8 and the latter with the pipe connections 18. Enclosed within the casing is a rotor 31 which is continuously driven by the concentric shaft 32. (Fig. 1.) The rotor has a diametrical groove 34 within which reciprocates a piston 36 having a transverse groove 38 to receive a shuttle block 40. The block 40 is adjustably positioned eccentrically of the rotor axis by a pin 42. The pin 42 passes through an elongated slot 44 in a head 46 which is attached to the casing. The pin 42 is secured in a sliding piston 48 which is adapted to be adjustably positioned within a cylinder 50 attached to the head 46. A rod 52 is connected to the piston 48 and protrudes through the head. The piston is normally urged to the right-hand position, as viewed in Fig. 2, by a spring 54 which bears against an internal nut 56. The rod 52 passes through a stuffing box 58 including packing 60 which is compressed by a spring-pressed gland 62. The limit of right-hand movement of the piston is determined by a stop 64 which is threaded into a nut 66 received in the end of the cylinder. As shown in Fig. 2, the control piston is in its extreme right-hand position which is the condition for minimum pumping. The stop 64 may be adjusted so that the control cylinder comes to rest with the pin 42 exactly in alignment with the axis of the rotor, in which case, the pump is wholly ineffective to do any work. It is preferred to stop the pin a little in advance of its exact central position so that the pump may operate to apply a slight pressure to the fluid, thereby keeping the hose full. When the rod 52 is moved outwardly, that is, to the left as viewed in Fig. 2, the pin is moved against the spring to a position eccentric to the rotor, thereby causing the piston to reciprocate in the rotor, the length of the piston stroke being determined by the eccentricity of the pin.

The rod 52, which controls the delivery of the pump, is actuated automatically from the hand trigger 24 by means of a Bowden wire 68 attached to the end of the rod and passing between a pair of pulleys 70 journaled in a head 72 which is attached to the end of the cylinder 50. The wire passes upwardly over pulleys 74 and 76 and then downwardly alongside the hose, being encased in a flexible sheath 78 of common form. The end of the wire is attached to a bell crank 80 which is formed as a part of the trigger 24.

It will be seen that when the trigger is in the position of Fig. 1 and the valve is closed, the pump is practically ineffective to deliver any fluid even though the motor is operating. Accordingly, the supply of fluid may be conveniently shut off merely by releasing the trigger without causing undue noise or vibration as in the ordinary form of pump. In order to dispense liquid, the trigger is pressed, thereby actuating the valve stem 22 to open the nozzle valve and at the same time drawing on the Bowden wire to place the pin 42 in a position eccentric to the rotor. The eccentricity of the pin is therefore made to depend upon the degree of opening of the valve so that the dispensing apparatus may be varied from closed to wide open position. For practically any delivery, the pump operates to discharge only the requisite amount of fluid that can be passed by the valve. The usual by-pass mechanism may therefore be eliminated.

Although the preferred form of pump is as described above, the present invention may be employed with any type of pump in which a control of delivery at constant speed can be effected. A modified form of pump is shown in Fig. 5. This pump comprises a casing 80 enclosing an eccentric rotor 82. The casing has inlet and outlet chambers 84 and 86. A shaft 88 carries three vanes, as indicated in Fig. 7. One of the vanes 90 is pinned to the shaft and the other two vanes 92 and 94 are freely mounted thereon. The vanes pass through openings 96 in the wall of the rotor, the openings affording slight clearance to permit a small angular adjustment between the vanes as the rotor is moved to different positions. The vane 90 drives the rotor and the rotor in turn drives the other two vanes. The shaft being concentric with the casing, permits the vanes always to ride in contact with the inner wall of the casing. Attached to the casing is a head exactly similar to the head 46 previously described, this head having an adjustable pin 42 which engages with the rotor. The delivery of the pump is varied in the same manner as in the construction previously described by determining the position of the pin with respect to the vane shaft. When the rotor is centrally located, a small amount of fluid merely circulates within the casing, there being no delivery to the hose. As the rotor is moved from its concentric position, internal chambers of varying volume are formed, as shown in Fig. 5, thereby conveying fluid from the inlet to the outlet. The volume of fluid delivered is dependent upon the eccentricity of the pin 42. As shown in Fig. 5, the rotor is in an intermediate position, but it may be varied from a position concentric with the shaft to a maximum position in which the left-hand side of the rotor contacts with the wall of the casing.

Figures 8, 9, 10, 11:
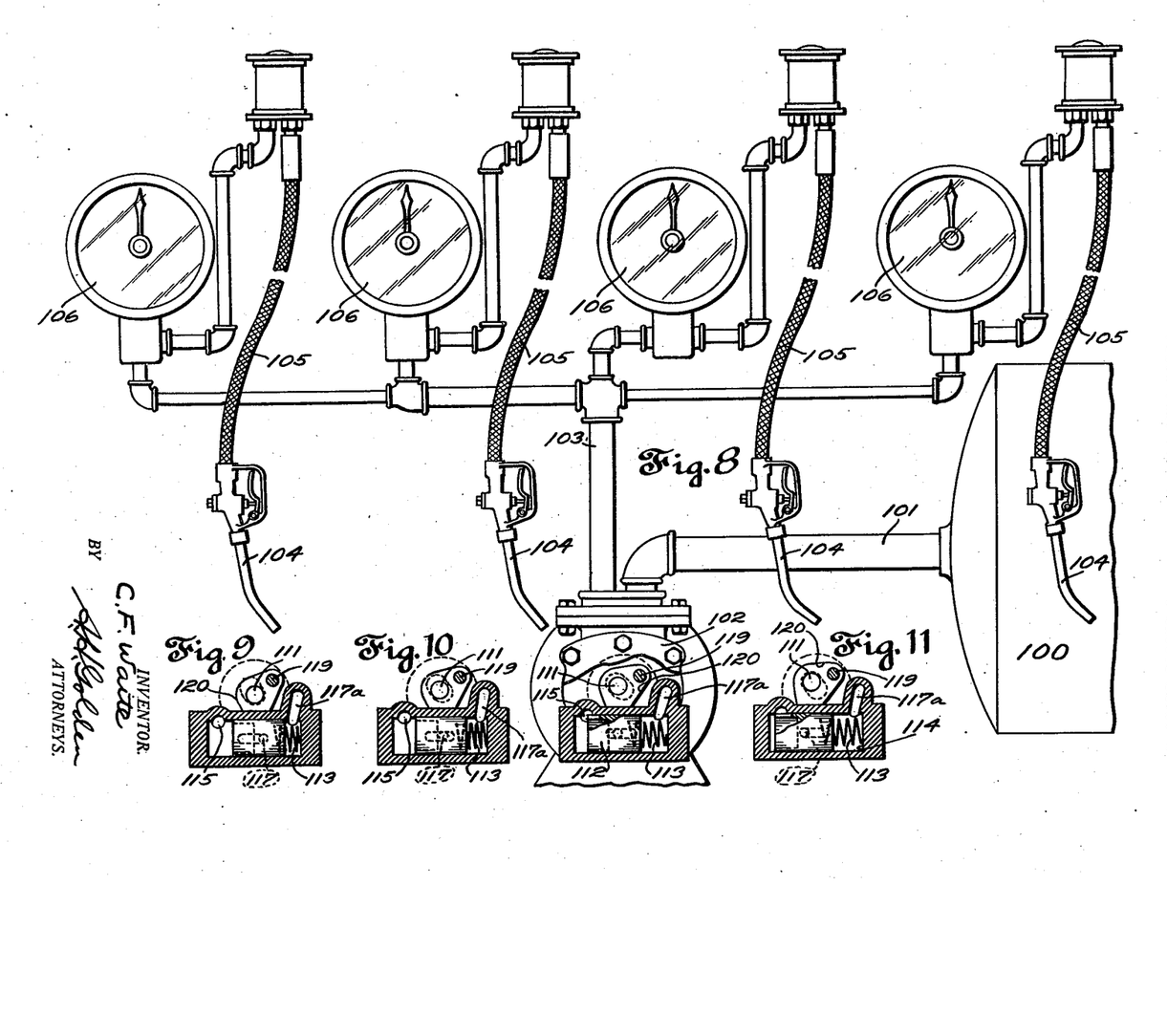
Fig. 8 illustrates a gasoline tank connected with a pump which in turn is connected with a series of pumping hose and nozzles of the type ordinarily found in a filling station.
Figs. 9, 10 and 11 illustrate modified positions of the controlling element of the pump for controlling the volume therethrough.

Referring now to Fig. 8 I show diagrammatically the assembly of mechanisms which I utilize in carrying out a preferred embodiment of my invention, while utilizing the general arrangement already described. I utilize a main storage tank 100 connected by piping 101 to a pump 102 which in turn is connected in parallel through piping 103 to a series of dispensing nozzles 104 at the ends of the dispensing hose 105, the pumping through which is measured by meters 106. It will readily be appreciated that the pump 102 must have a capacity sufficient to pump fluid through the dispensing hose 105 and the series of nozzles 104. At the same time, there must be present means for cutting down the pumping volume or else by-passing fluid which may be held back by the closing, partially or entirely, of one or all of the series of nozzles 104. Incidentally, while I show a particular type of nozzle and valve, it should be appreciated that my invention is applicable to various types of dispensing arrangements.

Under the principles of the first modification I described, the variable pumping member is operated by mechanism interconnected with the valve of the dispensing nozzles, and arranged to move the pumping element into various operating positions as the dispensing nozzle is opened and closed. It will be readily observed that to arrange the control piston carrying the eccentric pin so that it will be operated by a series of dispensing nozzles 104 instead of the valve of the single nozzle shown in Fig. 1, would require considerable effort and would be extremely difficult to accomplish effectively commercially. Furthermore, with the natural stretching of the cable utilized in my modification of Fig. 1, it will readily be seen that extreme inaccuracies would creep in, which would make it relatively difficult to operate the mechanism properly. Therefore, for controlling the volumetric effort of my pump 102, I utilize a sliding control piston carrying the eccentric pin for controlling the operating element of the pump, this sliding piston being dually controlled by the pumping pressure created by the pump in opposition to a spring normally urging the piston into a full pumping position. In this respect, I differ from my first modification in which the spring urges the piston into a concentric non-pumping position.

Referring now especially to Figs. 20, 22, 23 and 24, my pump embodies a rotor 107 of the type shown in Fig. 3, this rotor being equipped with auxiliary passages 108. The piston 109 operates in the rotor 107 and is reciprocated relatively to the shuttle member 110 which is maintained in an offset position by the pin member 111. As was indicated in connection with my first modification, the volume pumped by the rotor 107 and the piston 109 and the shuttle 110 depends entirely on the eccentricity of the pin 111. For controlling the eccentricity of the pin 111, I utilize a control piston 112 shown best in Fig. 12. Piston 112 is mounted in a cylindrical chamber 114 and is urged into a position corresponding to the full pumping control position of the pin 111, by a spring 113. A pin 113 is fixed to the piston and moves therewith as will be readily understood from a view of Fig. 12, and acts through certain elements indicated later, to control the positioning of pin 111.

Figures 12, 13, 14, 15:
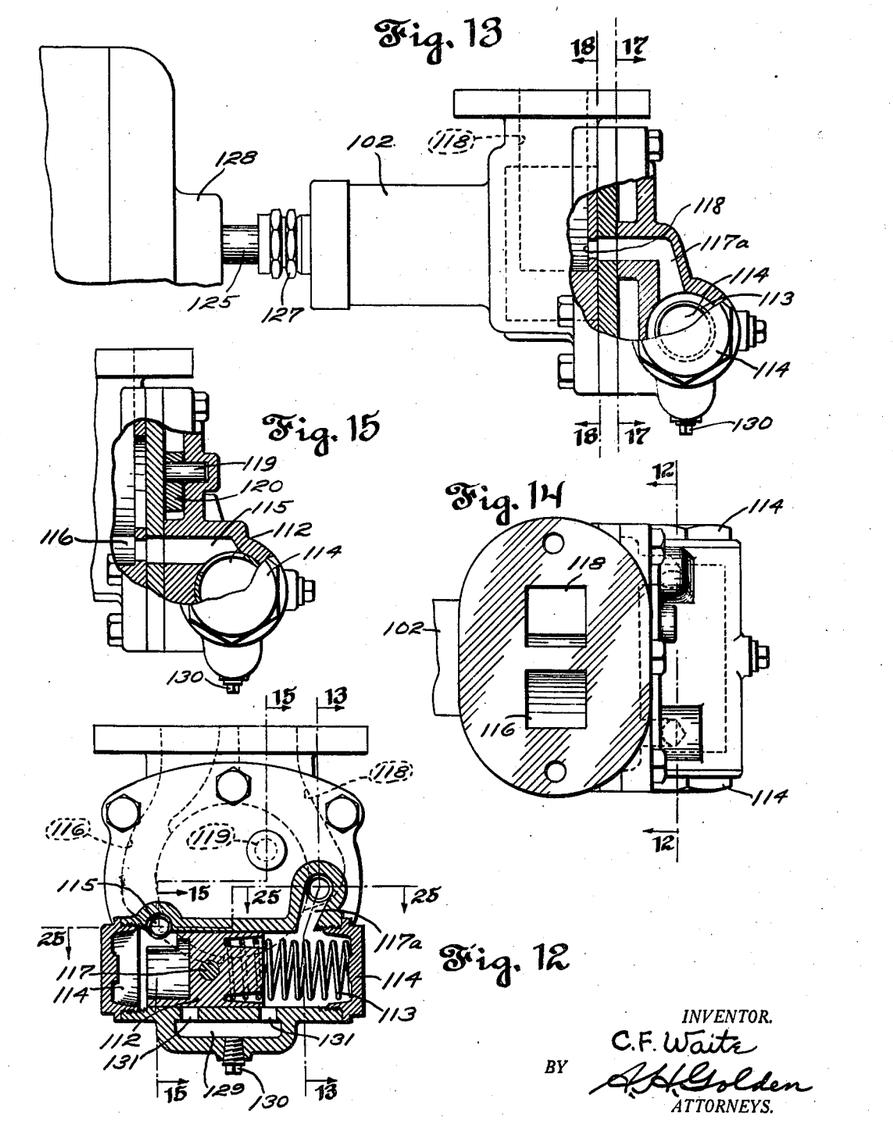
Fig. 12 is a view taken along section lines 12—12 of Fig. 14.
Fig. 13 is a view taken along lines 13—13 of Fig. 12, and showing the coupling of the pump to the motor driving it.
Fig. 14 is a top view of my pump looking down on Fig. 13.
Fig. 15 is a partial section taken along lines 15—15 of Fig. 12.
Figures 20, 21, 22, 23, 24, 25:
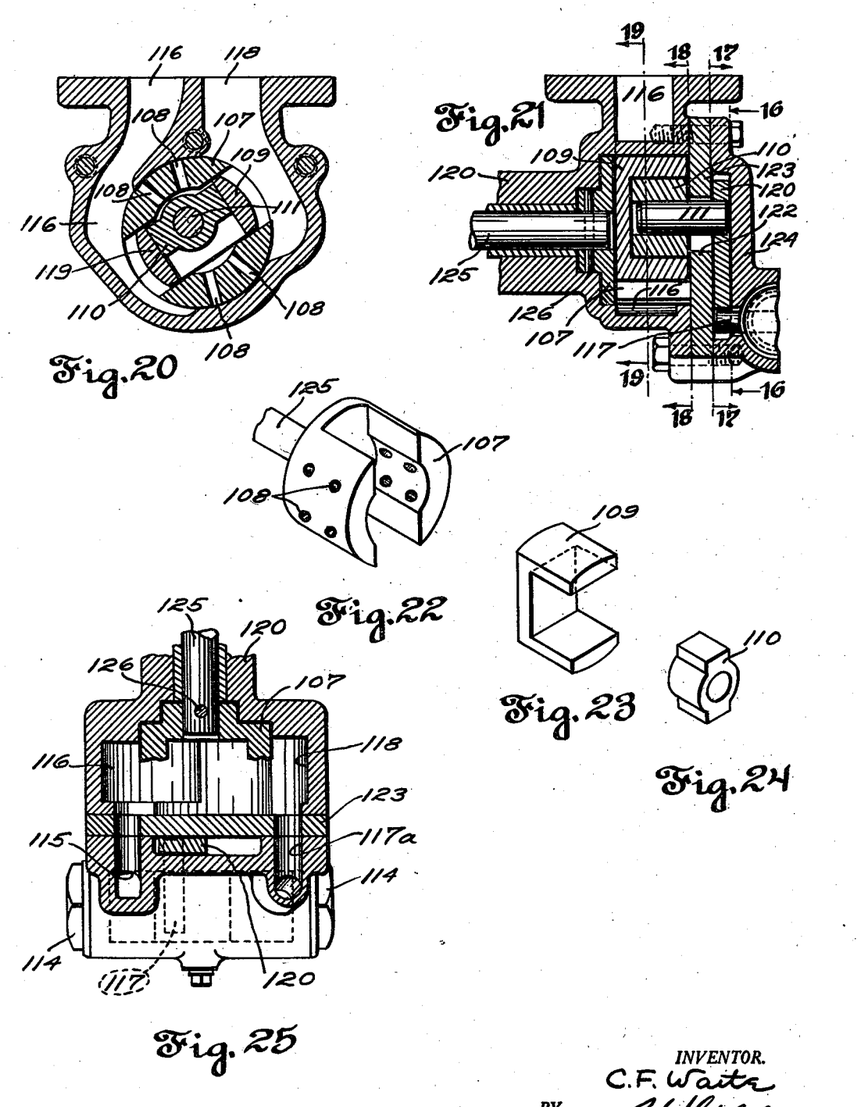
Fig. 20 is a section through the pump showing the relation of the various elements.
Figs. 22, 23 and 24 are perspective views of the pump parts forming my invention.
Fig. 21 is a view taken along lines 21—21 of Figs. 16 and 18.
Fig. 25 is a partial section taken along the lines 25—25 of Fig. 12.

The cylindrical chamber 114 is arranged to communicate, through the port 115, with the pressure side 116 of the pump. (Figs. 12, 13 and 25.) The spring side of the piston is adapted to communicate by means of port 117 with the intake side 118 of the pump. (Figs. 12, 15 and 25.)

Figure 16:
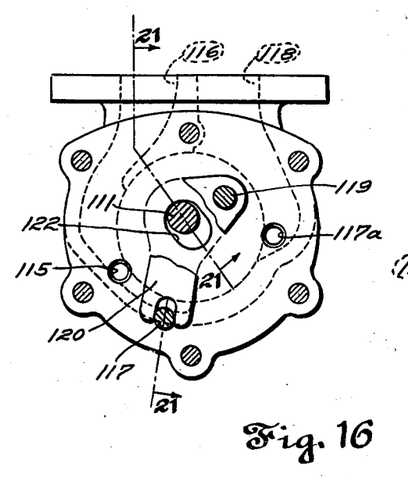
Fig. 16 is a sectional view taken along lines 16—16 of Fig. 21.
Figure 17:
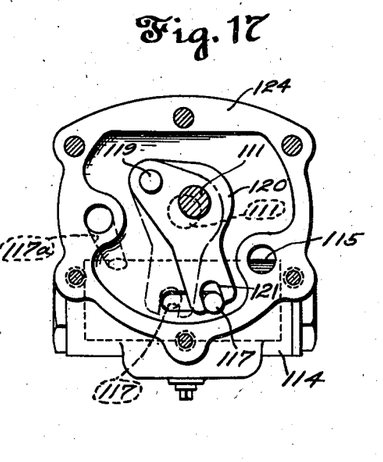
Figs. 17, 18 and 19 are additional sectional views taken along lines 17—17, 18—18 and 19—19 respectively of Fig. 21.
Figure 18:
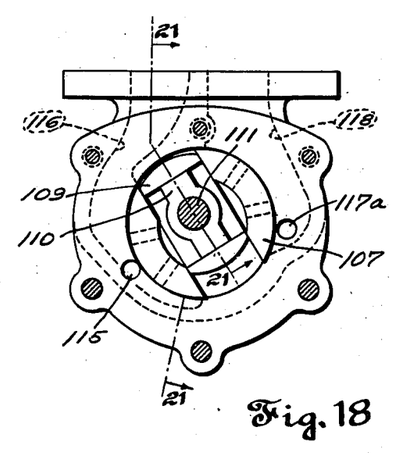
Figure 19:
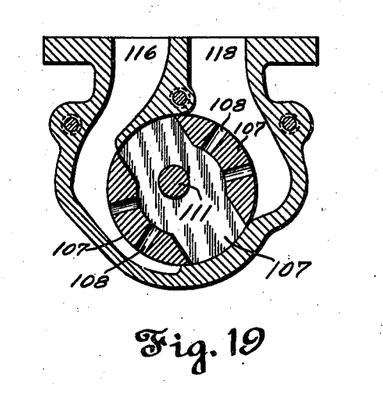

Referring now to Figs. 16 and 17, I illustrate how the piston 112, through pin member 117, is adapted to control the positioning of the pin member 111. There is mounted on the outside flange 124 of the pump, which incidentally, carries the cylinder member 114, a pin stud 119 which supports a control lever 120. This control lever is bifurcated at 121 in such a manner as to be operated by movement of the pin 117 as is best illustrated in Fig. 17. The pin 111 is fixedly mounted on the lever 120, and as the pin 117 moves the lever 120 backwards and forward under the influence of the pressure or the spring 113, it naturally moves the lever 120 about its pivot 119 as is shown in Fig. 17. This moves the pin 111 from a fully eccentric position such as illustrated in full lines to a fully concentric position as is illustrated in dotted lines.

In the dotted line position of the pin 117, which is the position into which it is urged by full expansion of the spring 113, when there is no pressure on the piston 112 on the pressure side thereof, the pin 11 will occupy a full pumping position. As, however, pressure builds up on the pressure side 116 of the pump, under conditions which will be explained presently, the piston is urged against the pressure of the spring 113, so as to bring the pin 117 into its full line position illustrated in Fig. 17 whereupon the pin 111 will be maintained in a fully concentric position so that there will be no pumping.

In Fig. 16, the control slot 122 in the intermediate plate 123 is illustrated and shows the possible movement of the pin 111 for controlling the pumping volume.

For actuating the rotor, I use a power shaft 125 which is pinned to the rotor at 126 and operates through the coupling 127 to connect the shaft to the motor 128 as best shown in Fig. 13. Because of the construction of my pump, it may be geared directly to a high speed motor depending naturally on the desired full volume which must be obtained.

For draining the water which may collect from the gasoline, I have a drain chamber 129 shown best in Fig. 12 which is in communication through ports 130 and 131 with the cylinder 114 so that water, being heavier than gasoline, will enter this chamber 129 and be withdrawn by the opening of the screw cock 130.

I shall now explain the operation of the embodiment of my invention, shown in Figs. 8-25 inclusive. The intake side of the pump is in communication, by means of passageway 117a, with the spring end of the piston 112 so as to maintain the pressure on the spring side of the piston the same as at the intake side of the pump. Figs. 12, 13, 25 illustrate the construction just described. The other side of the piston 112 is in communication, through the passageway 115, with the pressure side 116 of the pump, so that there will be maintained against the piston 112 such pressure as the pump is adapted to build up, depending, of course, on its dispensing volume. This construction is best shown in Figs. 12, 15 and 25.

It will be readily apparent that when all the nozzles 104 of the pumping apparatus are entirely closed, there will be built up a considerable pressure in the pumping system sufficient to balance the pressure of the spring 114 and move the pin 117 to its extreme right position, thus moving the control lever 120 to its position illustrated in Figs. 9 and 17 wherein the pin 111 will be in a concentric position so that the pump will rotate freely without any pumping movement of the piston 109 or the shuttle 110.

In this condition of the apparatus, should one of the nozzles be partially opened or completely opened, it will be readily seen that there will be a partial release of pressure on the left hand side of the piston 112 so that the piston will be urged somewhat to the left of its position illustrated in Fig. 9 to its position illustrated in Fig. 10, under the influence of the spring 113. This will permit the pin 111 to move to a position wherein the piston 109 and the shuttle block 110 will be permitted to have some throw so as to pump sufficient fluid to satisfy the opening of the particular nozzle. Should more of the nozzles be opened, or in the extreme condition, should all of them be opened, there will be a complete release of pressure on the left hand side of the piston 112 and as shown in Fig. 11, and the spring 113 will be permitted to throw the piston member 112 to an extreme position permitting full operation of the pump so as to supply sufficient fluid to satisfy the opening of all the nozzles 104.

It is thus readily seen that I am able to obtain, by means of my invention, a dispensing apparatus in which the pumping members will operate at such volume as to supply the opening of any one or all of the nozzles, or merely the partial opening of any of the nozzles, without the utilization of any complicated controls or other apparatus. I believe that this arrangement of a dispensing apparatus is completely novel. While I have shown modifications of my invention, I believe that various additional modifications utilizing the several principles disclosed, may be readily arranged by anyone skilled in the art. I therefore consider that in view of the considerable contribution I have made to the art, I am entitled to claims of broad scope.

I claim:

1. Dispensing apparatus comprising a pump, a dispensing nozzle connected to the discharge side of said pump and having a valve, manual control means for the valve, and means actuated through the operation of said control means to control the rate of volume of fluid pumped through the pump.

2. Dispensing apparatus comprising a pump having adjustable means to vary the delivery, a dispensing nozzle having a manually controlled valve, and connections between the valve and said adjustable means to control the delivery of the pump in accordance with the opening of the valve.

3. Dispensing apparatus comprising a pump, adjustable means in said pump to control the delivery of the pump, a dispensing nozzle connected to said pump and having a valve and connections between the valve and the adjustable means to vary the delivery of the pump in accordance with the degree of opening of the valve.

4. Dispensing apparatus comprising, in combination, a dispensing nozzle, a pump for supplying liquid to said dispensing nozzle, said pump having a casing, a rotary member, eccentric positioning means for governing the fluid delivery by the pump, a spring normally pressing the eccentric positioning means toward inactive position, a stop for limiting the movement of the eccentric positioning means toward inactive position, and control means operated at said dispensing nozzle for adjusting the eccentric positioning means against the spring.

5. Dispensing apparatus comprising, in combination, a dispensing nozzle, a pump for supplying liquid to said dispensing nozzle, said pump having a casing and a rotary member and a shaft for driving the rotary member, means for determining governing the delivery of the pump including adjustable means movable from an inactive position concentric with the shaft to a variable eccentric position, yielding means normally pressing said adjustable means toward inactive position, and a manual control operable at said dispensing nozzle for moving the adjustable means against said yielding means.

6. Dispensing apparatus comprising, in combination, a dispensing nozzle, a pump for supplying liquid connected to said dispensing nozzle, said pump having a rotor and a piston reciprocable in the rotor, a pin associated with said pump for determining the axis about which the piston turns and the degree of reciprocation of said piston, yielding means for pressing the pin toward an inactive position concentric with the shaft and corresponding to a non-pumping position, and manual means operable at said dispensing nozzle for moving the pin against the yielding means to a position eccentric relatively to the shaft.

7. Dispensing apparatus comprising, in combination, a dispensing nozzle, a pump for supplying liquid to said dispensing nozzle, said pump having a casing, a rotor, a piston reciprocable in the rotor, a shaft for driving the rotor, a pin determining an axis about which the piston turns, yielding means for pressing the pin toward an inactive position concentric with the shaft, manual means operable at the dispensing nozzle for moving the pin against the yielding means to a position eccentric to the shaft, and an adjustable stop to limit the movement of the pin toward inactive position under the influence of the yielding means.

8. Dispensing apparatus comprising, in combination, a dispensing nozzle, a pump for supplying liquid to said dispensing nozzle, said pump having a casing, a rotor having openings, a shaft, vanes on the shaft extending through the rotor openings and engaging the wall of the casing, a pin about which the rotor turns, yielding means for pressing the rotor toward a position concentric with the shaft, and manual means operable at said dispensing nozzle for moving the rotor axis against the yielding means to an eccentric position.

9. Dispensing apparatus comprising in combination, a dispensing nozzle, a pump for supplying liquid to said dispensing nozzle, said pump having a casing, a rotor, a piston reciprocable in the rotor, a shuttle in the piston, an adjustable pin about which the shuttle turns, a head having a slot through which the pin passes, a spring pressing on the pin to move it toward an inactive position substantially concentric with the rotor, manual means operable at said dispensing nozzle for moving the pin against the spring to an eccentric position.

10. Dispensing apparatus comprising in combination, a dispensing nozzle, a pump for supplying liquid to said dispensing nozzle, said pump having a casing, a rotor, a piston reciprocable in the rotor, a shuttle in the piston, an adjustable pin about which the shuttle turns, a head having a slot through which the pin passes, a spring pressing on the pin to move it toward an inactive position substantially concentric with the rotor, manual means at said dispensing nozzle for moving the pin against the spring to an eccentric position, and an adjustable stop to limit the movement of the pin toward inactive position under the influence of the pin.

11. Dispensing apparatus comprising a pump, a flexible hose connected to said pump, a nozzle at the end of said hose and having a valve, adjustable means for varying the delivery of the pump, means for manually controlling the valve, and means of connection between the valve and said adjustable means adapted to inflence the adjustable means to control the delivery of the pump in accordance with the opening of the valve.

12. Dispensing apparatus comprising a pump having adjustable means to vary the delivery thereof, a flexible hose connected to said pump, a dispensing nozzle at the end of said hose having a manually controlled valve, and connections between the valve and said adjustable means including a flexible wire disposed along the hose to control the delivery of the pump in accordance with the opening of the valve.

13. Dispensing apparatus comprising a pump having adjustable means to vary the delivery thereof, a dispensing nozzle having a valve, means connecting the outlet side of said pump directly to said nozzle by a pipe or hose having no by pass, manual control means for the valve, and means whereby the opening and closing of said dispensing nozzle valve will control said adjustable means to vary the delivery of the pump in accordance with the opening of the valve.

14. Dispensing apparatus comprising a pump having adjustable means to vary the delivery thereof, a dispensing nozzle having a valve, means connecting the outlet side of said pump to said nozzle, manual control means for the valve, and means whereby the opening and closing of said dispensing nozzle valve will control said adjustable means to vary the delivery of the pump in accordance with the opening of the valve.

15. Dispensing apparatus comprising a pump having adjustable means to vary the delivery thereof, a dispensing nozzle having a valve, means connecting the outlet side of said pump directly to said nozzle comprising a pipe or hose having no by pass, manual control means for the valve, and means operable incidentally to the opening and closing of said dispensing nozzle valve whereby to control said adjustable means to vary the delivery of the pump in accordance with the opening of the valve.

16. Dispensing apparatus comprising a pump having adjustable means to vary the delivery thereof, a dispensing nozzle having a valve, means connecting the outlet side of said pump to said nozzle, manual control means for the valve, and means operable incidentally to the opening and closing of said dispensing nozzle valve whereby to control said adjustable means to vary the delivery of the pump in accordance with the opening of the valve.

17. Dispensing apparatus comprising a dispensing nozzle equipped with a manually operated control valve, a pump for supplying fluid to said dispensing nozzle, said pump having a variable element whereby its pumping capacity may be varied between desired limits by the operation of said variable element, and means whereby said element is operated as the control valve of said nozzle is operated to determine the flow through said nozzle.

18. Dispensing apparatus comprising a dispensing nozzle equipped with a manually operated control valve, a pump for supplying fluid to said dispensing nozzle, said pump having a variable element whereby its pumping capacity may be varied between desired limits by the operation of said variable element, positioning means for said element, and means whereby said positioning means are operated incidental to the opening and closing of said nozzle valve to determine the flow through said nozzle.

19. The method of dispensing variable amounts of fluid through a dispensing nozzle connected to a variable capacity pump which consists in varying the capacity of the pump proportionately as said dispening nozzle is opened and closed to permit the flow of more or less fluid.

20. Dispensing apparatus comprising a pump having adjustable means to vary the delivery thereof, a dispensing hose connected to said pump and having a dispensing nozzle equipped with a manually controlled valve, means for operating said adjustable means to control the delivery of the pump in accordance with the opening of the valve, said operating means being controlled by the pressure developed between said nozzle and pump by the partial or full closing of said nozzle valve.

21. Dispensing apparatus comprising a pump having adjustble means to vary the delivery thereof, a series of dispensing hose connected to said pump and each having a dispensing nozzle equipped with a manually controlled valve for controlling the flow therethrough, positioning means for said adjustable means, said positioning means being controlled by the pressure developed between said nozzles and pump by the partial or full closing of one or all of said nozzle valves.

22. Dispensing apparatus comprising a dispensing nozzle equipped with a manually operated control valve, a pump for supplying fluid to said dispensing nozzle, said pump having a variable element whereby the pumping capacity may be varied between desired limits by the operation of said variable element, positioning means for said element, and means whereby said positioning means are controlled by the variations in pressure induced between said pump and nozzle incidental to the opening and closing of said nozzle valve.

23. Dispensing apparatus comprising a series of dispensing nozzles, each equipped with a manually operated control valve, a single pump for supplying fluid to all of said dispensing nozzles, said pump having a variable element whereby its pumping capacity may be varied so as to supply fluid sufficient for any one or all of said dispensing nozzles, positioning means for said element, and operating means for said positioning means controlled by the variations in pressure induced between said pump and nozzles by the opening or closing of any one or all of said nozzle valves.

24. Dispensing apparatus comprising a series of dispensing nozzles each equipped with a manually operated control valve, a single pump for supplying fluid to all of said dispensing nozzles, said pump having a variable element whereby its pumping capacity may be varied between desired limits by the operation of said variable element, positioning means for said element, a spring adapted to press said positioning means into a position to create a ful pumping effect, means whereby said positioning means are pressed against said spring into a position corresponding to a non-pumping position of said variable element when the pressure between the nozzles and pump is built up by the closing of all of said nozzle valves, said positioning means being movable by said spring to a pumping position sufficient to supply the particular quantity of fluid required by any one or all of said nozzles upon the release of pressure incidental to the opening of any one or all of said nozzles.

25. In a dispensing system, a series of dispensing nozzles, a single pump having means of connection to each one of said nozzles, means for varying the pumping capacity of said pump, said means being normally urged in a full pumping direction, means whereby the differential of the intake and outlet pressures induced between the nozzles and pump when the nozzles are closed urges said means in a non-pumping direction and holds said means in a non-pumping position, said pressure differential being relieved sufficiently upon the opening of any one or all of the dispensing nozzles to cause sufficient pumping to create a flow commensurate with the degree of opening of the said nozzles.

26. The method of dispensing variable amounts of fluid through a dispensing nozzle, connected to a variable capacity pump which consists in varying the capacity of the pump in accordance with the differential of the intake and outlet pressures induced between the nozzle and pump by the full or partial closing of said nozzle.

27. Dispensing apparatus comprising a pump having adjustable means to vary the delivery thereof, a dispensing nozzle having a valve, means connecting the outlet side of said pump directly to said nozzle by a pipe or hose having no by-pass, means for positioning said adjustable pump means, said positioning means being controlled by differential of the intake and outlet pressures in said pump and hose incidental to the opening and closing of said dispensing nozzle, whereby to vary the delivery of the pump in accordance with the opening of the nozzle valve.

28. Dispensing apparatus comprising a pump having adjustable means to vary the delivery thereof, a series of dispensing nozzles each having a valve, means connecting the outlet side of said pump directly to said nozzles by a series of pipes or hose having no by-passes, means for positioning said adjustable pump means, said means being controlled by variation in pressure in said pump and hose incidental to the opening and closing of any one or all of said dispensing nozzles, whereby to vary the delivery of the pump in accordance with the opening of the nozzle valves.

29. Dispensing apparatus comprising a pump having adjustable means to vary the delivery thereof, a dispensing nozzle having a valve, means connecting the outlet side of said pump directly to said nozzle by a pipe or hose having no by-pass, manual means for operating the valve, means for operating said adjustable pump means, said operating means being in turn controlled by the pressure induced on the outlet side of said pump incidental to the opening and closing of the dispensing nozzle valve, whereby to vary the delivery of the pump in accordance with the opening of the valve.

30. Dispensing apparatus comprising a pump having adjustable means to vary the delivery thereof, a series of dispensing nozzles, each having a valve, means connecting the outlet side of said pump directly to said series of nozzles by pipe or dispensing hose having no by-pass, manual means for controlling the said valves, means for operating said adjustable pump means, and means whereby said operating means are in turn controlled by the pressure induced in the outlet side of said pump incidental to the closing of any one or all of said dispensing nozzle valves, whereby to vary delivery of the pump in accordance with the opening of one or all of said valves.

31. Dispensing apparatus comprising a series of dispensing nozzles, each equipped with a manually operated control valve, a single pump for supplying fluid to all of said dispensing nozzles, said pump having a variably operating element whereby its pumping capacity may be varied between predetermined limits by the operation of said elements, operating means for said variably operating element arranged so as to be controlled by the pressure induced on the outlet side of said pump incidental to the opening and closing of one or all of said dispensing nozzle valves, whereby said element is varied as the control valves of one or all of said nozzles are operated.

32. Dispensing apparatus comprising a pump, a dispensing hose connected to said pump and having a dispensing nozzle equipped with a control valve, manual means for opening and closing said valve, means for controlling the output of said pump in accordance with the opening and closing of said valve, said means being actuated by the pressure developed between said nozzle and pump by the partial or full closing of said nozzle valve.

33. Dispensing apparatus comprising, in combination, a dispensing nozzle, a pump for supplying liquid to said dispensing nozzle, said pump having a casing, a rotary member, eccentric means for determining the fluid delivery by the pump, a spring normally pressing the eccentric means towards a full eccentric dispensing position, and means whereby said eccentric means are adapted to be controlled by pressure induced between the pump and dispensing nozzle upon the partial or full closing of said nozzle.

34. Dispensing apparatus comprising, in combination, a dispensing nozzle, a pump connected to said dispensing nozzle for supplying liquid thereto, said pump having a variably operating pumping member movable as determined by the positioning of an eccentric shuttle member and adapted to vary its pumping effort as the eccentricity of said shuttle member varies, means for varying the eccentricity of said shuttle member comprising means normally pressed into a position corresponding to a full eccentric pumping position of said shuttle, said means being arranged for movement into a concentric non-pumping position by the pressure induced between the nozzle and the pump when said nozzle is partially or fully closed.

35. In a dispensing system, a series of dispensing nozzles, a single pump having means of connection to each one of said nozzles, means for varying the pumping capacity of said pump, said means being normally urged in a full pumping direction, pressure means for urging said means in a non-pumping direction and adapted to hold said means in a non-pumping position, said pressure means being controlled by the opening of any one or all of said dispensing nozzles to cause sufficient pumping to satisfy the requirements of said opened nozzles.

36. Dispensing apparatus comprising a pump, a series of dispensing hose all adapted to be supplied from said one pump, a dispensing nozzle at the end of each of said hose, a variably operating pumping member in said pump, eccentric positioning means for said member adapted to vary the pumping effort thereof, a piston adapted to actuate said positioning means, a spring adapted to press said piston into a position corresponding to a full eccentric position of said positioning means and full pumping effort of said variably operating pumping member, means whereby the pressure induced in said dispensing hose upon the partial or full closing of any one or all of said dispensing nozzles may act against said piston to force it against said spring into a position corresponding to a decreased pumping effort of said pumping member, whereby the decrease and increase of pressure in the apparatus incidental to the opening and closing of said dispensing nozzles will determine the pumping effort of said pump.

37. In a dispensing system, a series of dispensing nozzles, a single pump having means of connection to each one of said nozzles, means for varying the pumping capacity of said pump, and means for controlling said means in proportion to the degree of opening of any one or all of said dispensing nozzles.

38. The method of dispensing variable amounts of fluid through a series of dispensing nozzles connected to a single variable capacity pump, which consists in varying the capacity of the pump in accordance with the pressure induced between the nozzles and pump by the full or partial closing of one or all of said nozzles.

CHARLES F. WAITE.